US008493324B2

United States Patent
Kuo

(10) Patent No.: US 8,493,324 B2
(45) Date of Patent: Jul. 23, 2013

(54) APPARATUS AND METHOD GENERATING INTERACTIVE SIGNAL FOR A MOVING ARTICLE

(75) Inventor: Shih-Ti Kuo, Kaohsiung (TW)

(73) Assignees: Symax Technology Co., Ltd., Kaohsiung (TW); Shih-Ti Kuo, Kaohsiung (TW)

( * ) Notice: Subject to any disclaimer, the term of this patent is extended or adjusted under 35 U.S.C. 154(b) by 1195 days.

(21) Appl. No.: 11/972,231

(22) Filed: Jan. 10, 2008

(65) Prior Publication Data

US 2009/0179858 A1   Jul. 16, 2009

(51) Int. Cl.
*G06F 3/033* (2013.01)

(52) U.S. Cl.
USPC .......................................... 345/158; 340/669

(58) Field of Classification Search
USPC ....................... 340/573.1; 345/158
See application file for complete search history.

(56) References Cited

U.S. PATENT DOCUMENTS

| 2004/0095317 | A1* | 5/2004 | Zhang et al. | 345/158 |
| 2006/0033713 | A1* | 2/2006 | Pryor | 345/158 |
| 2007/0060384 | A1* | 3/2007 | Dohta | 463/43 |
| 2007/0211026 | A1* | 9/2007 | Ohta | 345/158 |
| 2007/0211027 | A1* | 9/2007 | Ohta | 345/158 |

* cited by examiner

*Primary Examiner* — Hezron E Williams
*Assistant Examiner* — Gregory J Redmann
(74) *Attorney, Agent, or Firm* — Chun-Ming Shih; HDLS IPR Services

(57) ABSTRACT

An airplane model is provided with a human-sensible interactive signal source; and the moving status of the air plane model such velocity is detected to generate a movement parameter. The movement parameter is operated with a frequency-dependent conversion function to obtain a first interactive data. A second interactive data is generated when a trace of the moving article is matched with a default pattern. A third interactive data is generated when the velocity along at least one dimension exceeds a threshold value. The interactive signal source, such as loudspeaker or lamps, is selectively driven by one of the interactive data to generate a movement-dependent audiovisual effect. Therefore, the airplane model can provide enhanced amusement effect for a user.

20 Claims, 4 Drawing Sheets

APPARATUS AND METHOD GENERATING INTERACTIVE SIGNAL FOR A MOVING ARTICLE

BACKGROUND OF THE INVENTION

1. Field of the Invention

The present invention relates to an apparatus and method generating interactive signal for a moving article, especially to an apparatus and method generating interactive audio and visual signal for a moving airplane model.

2. Description of Prior Art

The conventional toys for game are augmented with electronic gadget as the mature of semiconductor processing technology and digital signal processing ability advanced. Therefore, the modern toys are featured with fancy audio-visual effect and versatile manipulation at operation.

US pre-grant publication 2006/0033713 discloses an interactive game system with a TV camera and video display such as a large-screen TV With reference to FIG. 1A and FIG. 1B, the interactive game system comprises two cameras 530 and a computer 535, wherein the cameras 530 catch the images of marks 510, 511 and 512 on an airplane model 505 and provide the images to the computer 535 for obtaining a moving trajectory of the airplane model 505. The computer 535 shows the image and moving trajectory of the airplane model 505 on TV screen. Therefore, user can play air combat with another airplane simulated by computer even though only one player is present.

However, the above-mentioned game system needs bulky equipment such as camera 530 and computer 535 to achieve interactive game effect. It is troublesome for user. The compact acceleration sensor is widely available as the process of MEMS is improved. It is desirable to exploit the technology of speed or acceleration sensing to toys to provide enhanced amusement.

SUMMARY OF THE INVENTION

It is the object of the present invention to provide an apparatus and method generating interactive signal for a moving article.

Accordingly, the present invention provides an apparatus generating interactive signal for a moving article. The apparatus generating interactive signal for a moving article comprises a velocity sensor; a micro controller unit (MCU) electrically connected to the velocity sensor; a database electrically connected to the MCU and storing a plurality of interactive data; and an interactive signal source. The velocity sensor is fixed to the moving article and senses a movement parameter of the moving article. The velocity sensor sends the movement parameter to the MCU for processing. The MCU selects at least one interactive data for driving the interactive signal source.

Moreover, the present invention provides a method for generating interactive signal for a moving article with an interactive signal source. A movement status of the moving article is detected to generate a movement parameter. An operation is performed on the movement parameter with a frequency-dependent conversion function to obtain a first interactive data. The moving trace of the moving article is compared with a default trace. A second interactive data is generated when the comparison is matched. The velocities of the moving article in three dimensional are also compared with corresponding thresholds. A third interactive data is generated when one of the velocities of the moving article exceeds corresponding threshold. The first, second, and third interactive data are selectively supplied to interactive signal sources such as lamps or loudspeaker to generated movement-related audio and visual effect. For example, the audio frequency of loudspeaker or the flashing frequency of lamp can be increased with moving velocity. A special sound effect is generated when the trace of the moving article is matched with a default trace pattern for encouraging user.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1A:
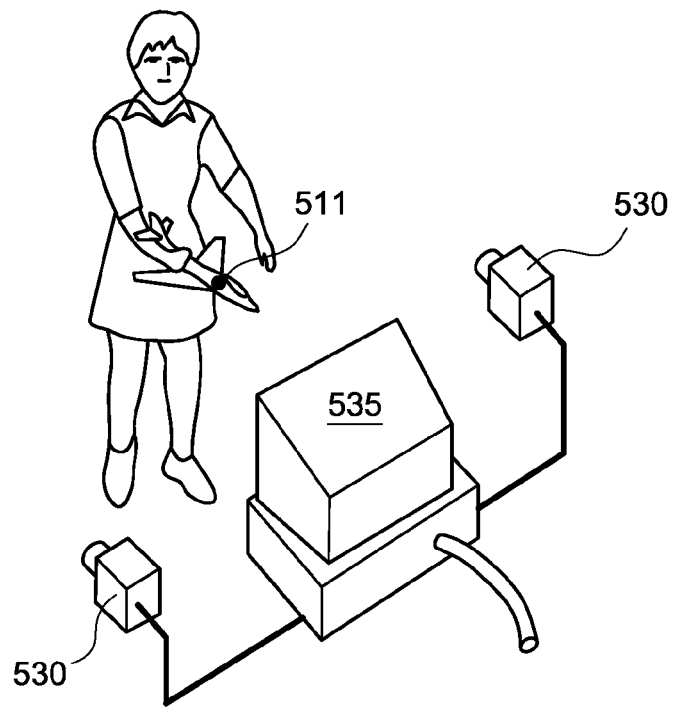
FIG. 1A and FIG. 1B shows a prior art interactive game system.
Figure 1B:
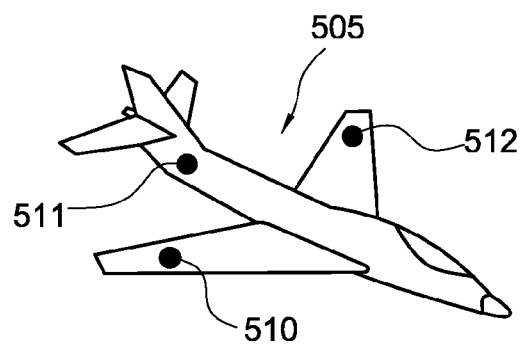
Figure 2:
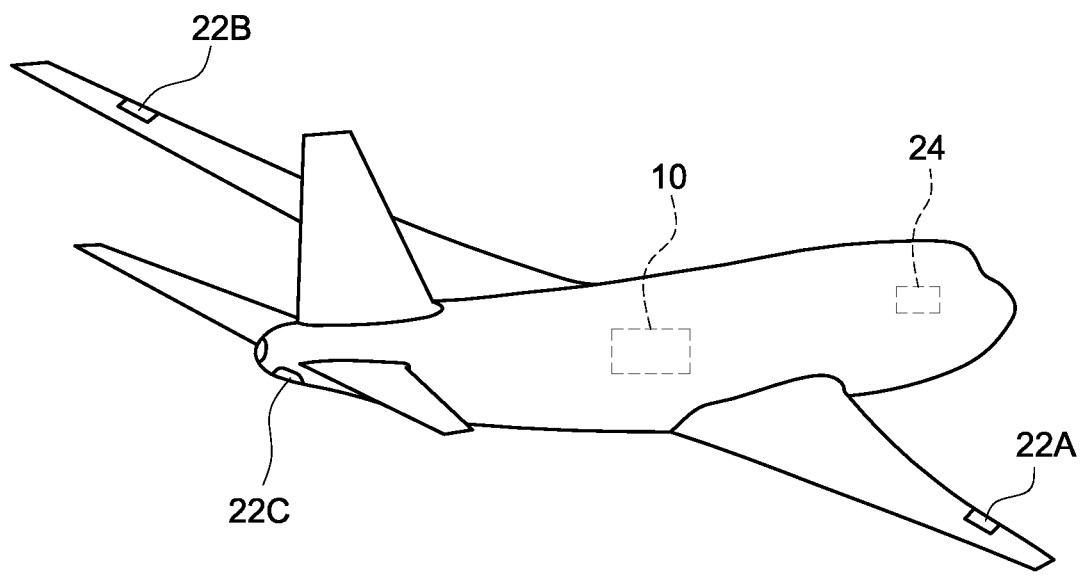
FIG. 2 shows a schematic view according to a preferred embodiment of the present invention.

FIG. 2 shows a schematic view according to a preferred embodiment of the present invention. The present invention provides an interactive-signal generating apparatus 10 for a moving article 20 such as an airplane model. The interactive-signal generating apparatus 10 senses a movement status of the airplane model 20 to generate human-sensible interactive signals such as sound or lighting. As shown in this figure, human-sensible interactive signal sources (such as sound unit or lighting unit) are provided at predetermined positions of the airplane model 20. For example, two lateral lamps 22A and 22B are provided on two wings of the airplane model 20, respectively, and a tail lamp 22C is provided at tail of the airplane model 20, and a loudspeaker 24 is provided within the airplane model 20. The lamps 22A, 22B and 22C and the loudspeaker 24 are electrically connected to the interactive-signal generating apparatus 10 and controlled by the interactive-signal generating apparatus 10.

Figure 3:
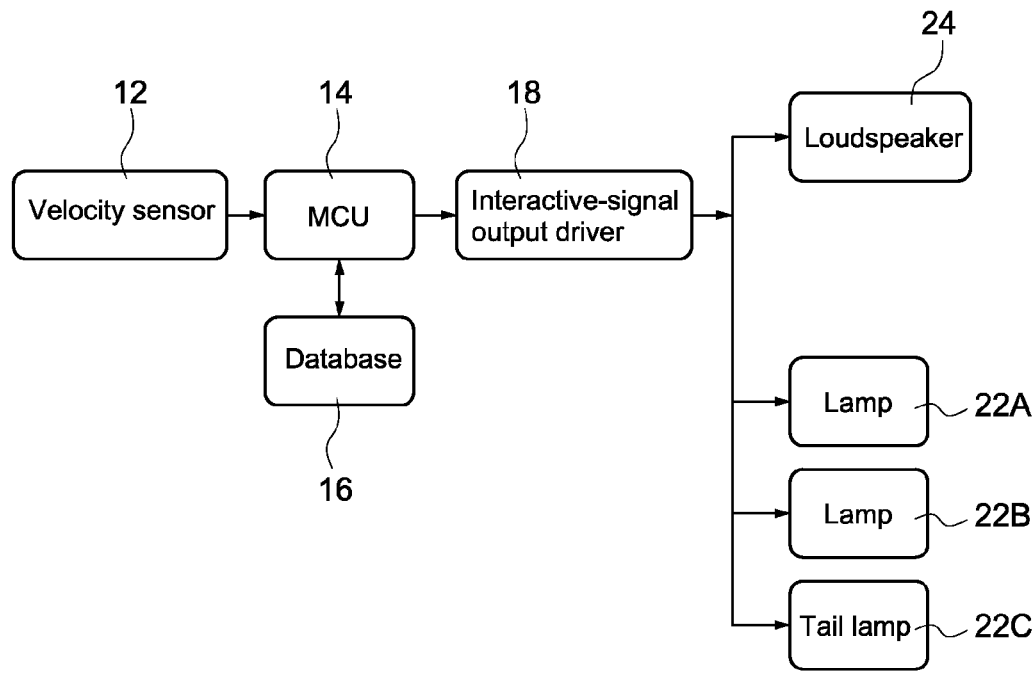
FIG. 3 shows the block diagram of the interactive-signal generating apparatus according to a preferred embodiment of the present invention.

FIG. 3 shows the block diagram of the interactive-signal generating apparatus 10 according to a preferred embodiment of the present invention. The interactive-signal generating apparatus 10 comprises a velocity sensor 12, a micro controller unit (MCU) 14, a database 16 (explained in more detail later), an interactive-signal output driver 18, which are electrically connected to each other. Moreover, the interactive-signal generating apparatus 10, the lamps 22A, 22B and 22C and the loudspeaker 24 are electrically connected to a power source (not shown) such as a battery to acquire electrical power. The velocity sensor 12 is fixed to the airplane model 20 to sense the movement of the airplane model 20 and generates movement parameters such as velocity, acceleration and trajectory (trace) for the airplane model 20. The MCU 14 refers to the movement parameters and the data in the database 16 to generate interactive-signal for driving the lamps 22A, 22B and 22C and the loudspeaker 24. Therefore, interactive audiovisual effect in response to the velocity, acceleration or trajectory of the airplane model 20 can be produced.

Figure 6:
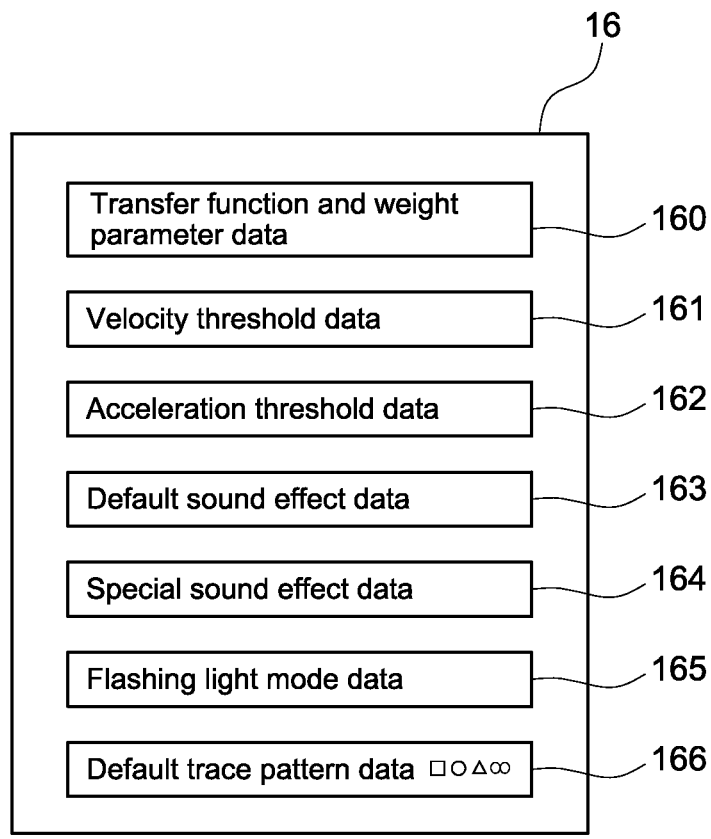
FIG. 6 shows the example of database in the present invention.

With reference to FIG. 6, the database 16 comprises, for example, transfer function and weight parameter data 160, velocity threshold data 161, acceleration threshold data 162, default sound effect data 163, special sound effect data 164, flashing light mode data 165, and default trace pattern data 166. The MCU 14 determines an interactive effect with reference to the transfer function and weight parameter data 160, the velocity threshold data 161, the acceleration threshold data 162, and the default trace pattern data 166; and then selectively reads audio-visual data in the default sound effect data 163, the special sound effect data 164, and/or the flashing light mode data 165. The audio-visual data is used to drive the lamps 22A, 22B and 22C and/or the loudspeaker 24 through the interactive-signal output driver 18. The interactive-signal output driver 18 is functioned to generate audio signal and visual signals according to the audio-visual data in the special sound effect data 164, and/or the flashing light mode data 165. The interactive-signal output driver 18 also adjusts the level or power of audio signals and visual signals. Therefore, the audio signals and visual signals can be adaptively generated for loudspeaker and lamps of different specifications, for example, loudspeakers of different output powers or LEDs (light emitting diode) of different colors. The interactive-signal output driver 18 can also be built in the MCU 14.

Figure 4:
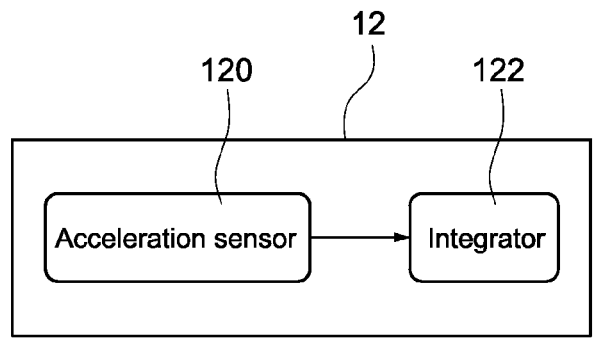
FIG. 4 shows a preferred embodiment of the velocity sensor.

FIG. 4 shows a preferred embodiment of the velocity sensor 12. The velocity sensor 12 comprises, for example, an acceleration sensor 120 and an integrator 122. The acceleration sensor 120 is, for example, the H48C sensor of Hitachi, which can sense the accelerations Ax', Ay', Az' along three axes of the acceleration sensor 120. The accelerations Ax', Ay', Az' are integrated once to obtain velocities Vx', Vy', Vz' along three axes of the acceleration sensor 120. The acceleration Ax', Ay', Az' are integrated twice to obtain trajectory S(x', y', z'). The acceleration sensor 120 uses a coordinate frame itself for sensing and the velocity sensor 12 is fixed to the airplane model 20. Therefore, the above-mentioned movement parameters of velocity (Vx', Vy', Vz'), accelerations (Ax', Ay', Az') and trajectory S(x', y', z') can be easily transformed to the movement parameters based on the coordinate frame (x, y, z) of the airplane model 20. Hereinafter, the movement parameters of velocity, accelerations and trajectory will be expressed in terms of the coordinate frame (x, y, z) of the airplane model 20. Moreover, the acceleration sensor 120 can also be integrated into the MCU 14 to exploit the computation power of the MCU 14.

The interactive-signal generating apparatus 10 according to the present invention for airplane model 20 can be exemplified by following applications.

I. The Simulation for Flying Sound and Lighting of Airplane

The interactive-signal generating apparatus 10 according to the present invention is arranged in an airplane model 20. The airplane model 20 can be held by a user to move in air. The velocity sensor 12 senses the three axes accelerations (Ax, Ay, Az) and the MCU 14 converts the three axes accelerations (Ax, Ay, Az) into three axes velocities (Vx, Vy, Vz). The MCU 14 uses the three axes velocities (Vx, Vy, Vz) as parameters to generate audio effect. For example, the MCU 14 fetches sound data in the default sound effect data 163 for velocity of each axis and mixes the sound data with weighting ratio dependent to the three axes velocities (Vx, Vy, Vz). The mixed sound data is sent to the interactive-signal output driver 18 to drive the loudspeaker 24. Moreover, the MCU 14 can select the largest one of the three axes velocities (Vx, Vy, Vz), and select sound data associated with the largest velocity from the default sound effect data 163. The selected sound data sent to the interactive-signal output driver 18 to drive the loudspeaker 24.

The sound data corresponding to different axes are explained below.

The velocity Vx represents the flying direction (forward direction) of the airplane and the default sound effect data 163 contains data for flying sound effect.

The velocity Vy represents the left turn and right turn directions of the airplane and the default sound effect data 163 contains data for screaming sound effect to simulate the turning of airplane.

The velocity Vz represents the speeding upward or stalling downward of the airplane and the default sound effect data 163 contains data for engine sound effect for the airplane.

The MCU 14 can find the largest one among the three velocities Vx, Vy, and Vz, and selects sound effect in the default sound effect data 163 with respect to the largest velocity component. For example, if the largest velocity component is velocity Vy, then the MCU 14 fetches sound effect corresponding to screaming sound effect of a turning airplane. The screaming sound effect is then sent to the loudspeaker 24. Moreover, the MCU 14 can also mix the sound effect corresponding different velocity components when the velocity components exceed certain threshold stored in the velocity threshold data 161. For example, if the velocity components Vx and Vy exceed certain threshold, the sound effect corresponding to flying sound and turning sound of the airplane are fetched and then mixed by the MCU 14. The mixed sound effect is then sent to the loudspeaker 24.

Figure 5:
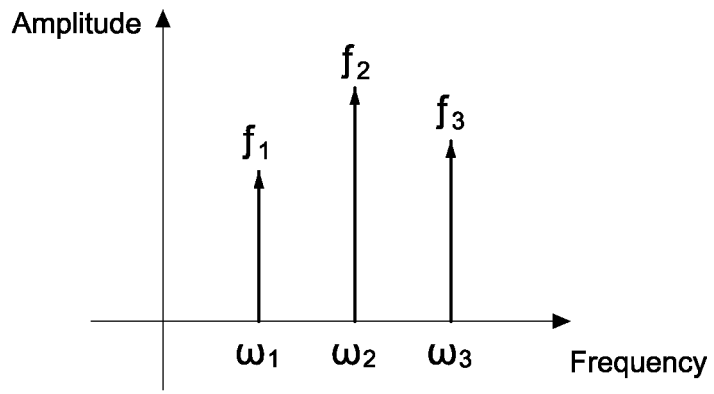
FIG. 5 shows an example for the sound frequency variation.

Beside the sound effect for different velocity components along three dimensions, the sound effect or lighting effect can also be generated with frequency variation. FIG. 5 shows an example for the sound frequency variation. Specific velocity-sound frequency conversion function or acceleration-sound frequency conversion function can be set for each dimension.

For example, with reference to FIG. 5, the velocity-sound frequency conversion function can set as:

$$\text{Sound} = f_1(v_x) \otimes f(\omega_1) + f_2(v_y) \otimes f(\omega_2) + f_3(v_z) \otimes f(\omega_3)$$

As can be seen from above formula, there is a specific conversion function $f_1, f_2, f_3$ (such as linear function, piece-wise function or Gaussian function) for the velocity components Vx, Vy, and Vz. Moreover, there are different weighting values for different frequencies, namely, weighting values $f(\omega_n)$, n=1, 2, 3. The above-mentioned conversion functions and weighting values are stored in the transfer function and weight parameter data 160. Moreover, the conversion functions and weighting values are different for different dimensions.

Provided that the conversion function is a linear function and the weighting factor is a constant, the sound frequency of the loudspeaker 24 is higher when the velocity of the airplane model 20 is higher. Moreover, linear functions with different slopes can be used as conversion function for velocities Vx, Vy, Vz in three dimensions respectively. The sound effects for the velocities Vx, Vy, Vz in three dimensions are mixed to drive the loudspeaker 24. Therefore, the sound effect is different when the user moves the airplane model 20 in different 3D trajectories. Moreover, the similar conversion function can also be applied to the lighting effect of the airplane model 20. The light flash is faster when the airplane model 20 is moved faster.

II. The Sound Effect for Flying Trace of the Airplane Model

With reference to FIG. 6, the database 16 comprises default trace pattern data 166, which stores default trace pattern such as circle shape, triangular shape, number-8 shape or square shape. The database 16 also comprises special sound effect data 164 corresponding to the default trace patterns. When the trace of the airplane model detected by the apparatus for generating interactive signal of the present invention is matched with one of the default trace patterns, the MCU 14 drives the loudspeaker 24 to generate bonus soundtrack for informing or encouraging user. Moreover the MCU 14 can drive the loudspeaker 24 to generate sound emulating machine gun when the MCU 14 senses a vibrational movement of the airplane model 20.

III. Flying Lighting for Airplane Model

With reference to FIG. 2, the airplane model 20 is assumed to move forward along Vx direction, move leftward and rightward along Vy direction and upward and downward along Vz direction. The MCU 14 measures the velocity/acceleration along three dimensions of the airplane model 20 and compares the velocity/acceleration of the airplane model 20 with the velocity/acceleration thresholds in the velocity threshold data 161 and the acceleration threshold data 162. When the left or right velocity along Vy direction exceeds a predetermined threshold, the MCU 14 drives the interactive-signal output driver 18 to light one of the lamps 22A and 22B in order to manifest the left turn or right turn of the airplane model 20. When the forward velocity along Vx exceeds a predetermined threshold, the MCU 14 drives the interactive-signal output driver 18 to light the lamp 22C at tail of the airplane model 20 in order to manifest the jet of the airplane model 20.

Moreover, the airplane model 20 can be provided with an operation switch (not shown) to select one of the three above-mentioned operations, or other mode. For example, the MCU 14 can be controlled by the operation switch to select the flashing light mode data 165 and drives the lamps in predetermined modes (sequentially flashing or randomly flashing).

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A toy model capable of generating interactive signal, comprising:
    a body;
    a velocity sensor fixed to the body;
    a micro controller unit (MCU) arranged in the body and electrically connected to the velocity sensor;
    a database arranged in the body, electrically connected to the MCU and storing a plurality of interactive data selected from a group of transfer function and weight parameter data, velocity threshold data, acceleration threshold data, default sound effect data, special sound effect data, flashing light mode data and default trace pattern data;
    an interactive-signal output driver arranged in the body and electrically connected to the MCU; and
    an interactive signal source provided at a predetermined position of the body and electrically connected to the interactive-signal output driver,
    wherein the velocity sensor senses a movement parameter of the toy model, the velocity sensor sends the movement parameter to the MCU for processing, and the MCU determines an interactive effect, which includes a sound effect for flying simulation, a sound effect for matching flying trace and a lighting effect for flying simulation of the toy model, with reference to the database and then selects at least one interactive data and reads audio-visual data therein for driving the interactive signal source through the interactive-signal output driver, and
    wherein the interactive-signal output driver adjusts level or power of audio signals and visual signals generated by the MCU according to the audio-visual data so that the audio signals and the visual signals are adaptively generated for the interactive signal source to perform the interactive effect.

2. The toy model capable of generating interactive signal as in claim 1, wherein the movement parameter includes velocities along three dimensional directions, and the MCU determines the largest one among flying direction velocity, turning velocity, and upward/downward velocity to perform the sound effect for flying simulation of the toy model.

3. The toy model capable of generating interactive signal as in claim 2, wherein the interactive signal source is a loudspeaker and the interactive data is the default sound effect data.

4. The toy model capable of generating interactive signal as in claim 1, wherein the sound effect for flying simulation of the toy model is performed by operating the velocity along three dimensional directions with at least one conversion function.

5. The toy model capable of generating interactive signal as in claim 1, wherein the MCU is configured to compare a trace deduced from the velocity along three dimensional directions and a default trace in the database, and the MCU is configured to sends a special sound effect in the database when the trace is matched with the default trace in the database.

6. The toy model capable of generating interactive signal as in claim 5, wherein the default trace is one of circle shape, triangular shape, number-8 shape or square shape.

7. The toy model capable of generating interactive signal as in claim 1, wherein the velocity sensor comprises an accelerator sensor and the movement parameter is acceleration along three dimensions.

8. The toy model capable of generating interactive signal as in claim 7, further comprising
    an integrator to perform integration on output of the accelerator sensor.

9. The toy model capable of generating interactive signal as in claim 1, wherein the interactive source is a lamp and the interactive data is signal to drive the lamp.

10. The toy model capable of generating interactive signal as in claim 9, wherein the toy model is an airplane model and the lamp comprises light emitting diode (LED) lamps on wings of the airplane model.

11. The toy model capable of generating interactive signal as in claim 9, wherein the toy model is an airplane model and the lamp comprises a light emitting diode (LED) lamp on tail of the airplane model.

12. The toy model capable of generating interactive signal as in claim 10, wherein the movement parameter is velocity of three dimensions and the MCU is configured to drive one of lamps on wings of the airplane model to flash when a left direction velocity or a right direction velocity exceeds a threshold in the velocity threshold database.

13. The toy model capable of generating interactive signal as in claim 11, wherein the movement parameter is velocity of three dimensions and the MCU is configured to drive the lamp on tail of the airplane model to flash when a forward velocity exceeds a threshold in the velocity threshold database.

14. A method for generating interactive signal, comprising:
providing a toy airplane model, a velocity sensor fixed to the toy airplane model, a micro controller unit (MCU) arranged in the toy airplane model and electrically connected to the velocity sensor, a database arranged in the toy airplane model, electrically connected to the MCU and storing a plurality of interactive data choosing from transfer function and weight parameter data, velocity threshold data, acceleration threshold data, default sound effect data, special sound effect data, flashing light mode data and default trace pattern data, an interactive-signal output driver arranged in the toy airplane model and electrically connected to the MCU, and an interactive signal source provided at a predetermined position of the toy airplane model and electrically connected to the interactive-signal output driver;
detecting a movement status of the toy airplane model to generate a movement parameter by the velocity sensor;
performing an operation based on the movement parameter with a frequency-dependent conversion function to determine an interactive effect, which includes a sound effect for flying simulation, a sound effect for matching flying trace and a lighting effect for flying simulation of the toy model, with reference to the database and then select the interactive data and read audio-visual data therein by the MCU;
providing the interactive data to the interactive-signal output driver for adjusting level or power of audio signals and visual signals generated by the MCU according to the audio-visual data; and
supplying the audio signals and the visual signals for driving the interactive signal source through the interactive-signal output driver to perform the interactive effect.

15. The method in claim 14, wherein the interactive signal source is a loudspeaker and the movement parameter is one of velocity in three dimensions and acceleration in three dimensions.

16. The method in claim 15, wherein an audio frequency of the loudspeaker is varied with the velocity in three dimensions or acceleration in three dimensions.

17. The method in claim 14, wherein the interactive signal source is at least one lamp and the movement parameter is one of velocity in three dimensions and acceleration in three dimensions.

18. The method in claim 15, wherein a flashing frequency of the lamp is varied with the velocity in three dimensions or acceleration in three dimensions.

19. A method for generating interactive signal, comprising:
providing a toy airplane model, a velocity sensor fixed to the toy airplane model, a micro controller unit (MCU) arranged in the toy airplane model and electrically connected to the velocity sensor, a database arranged in the toy airplane model, electrically connected to the MCU and storing a default trace pattern data, and an interactive signal source provided at a predetermined position of the toy airplane model and electrically connected to the MCU;
detecting a movement status of the toy airplane model to generate a movement trace by the velocity sensor;
comparing the movement trace with the default trace pattern by the MCU;
driving the interactive signal source to generate an interactive signal by the MCU when the comparison is matched.

20. The method in claim 19 wherein the interactive signal source is a loudspeaker and the default pattern is one of circle shape, triangular shape, number-8 shape or square shape.

* * * * *